United States Patent [19]
van Ooijen et al.

[11] Patent Number: 5,442,702
[45] Date of Patent: Aug. 15, 1995

[54] METHOD AND APPARATUS FOR PRIVACY OF TRAFFIC BEHAVIOR ON A SHARED MEDIUM NETWORK

[75] Inventors: Gijsbertus G. van Ooijen, Eemnes; Robert J. M. Verbeek, Hoevelaken, both of Netherlands

[73] Assignee: AT&T Corp., Murray Hill, N.J.

[21] Appl. No.: 159,348

[22] Filed: Nov. 30, 1993

[51] Int. Cl.$^6$ .............................................. H04L 9/00
[52] U.S. Cl. ........................................ 380/23; 380/49
[58] Field of Search .................. 380/21, 46, 34, 23, 380/49

[56] References Cited

U.S. PATENT DOCUMENTS

| | | | |
|---|---|---|---|
| 4,531,021 | 7/1985 | Bluestein et al. | 380/21 |
| 4,757,532 | 7/1988 | Gilham | 380/21 |
| 4,980,913 | 12/1990 | Skret | 380/23 |
| 5,103,459 | 4/1992 | Gilhousen et al. | 380/34 |
| 5,208,853 | 5/1993 | Armbruster et al. | 380/46 |
| 5,303,303 | 4/1994 | White | 380/49 |
| 5,386,470 | 1/1995 | Carter et al. | 380/23 |
| 5,386,471 | 1/1995 | Bianco | 380/49 |

OTHER PUBLICATIONS

H. H. Grotjohann, F. Jaegar and P. G. Schaafsma, Dutch FTTH on Trial, Communications International, pp. 49–56 (Jan. 1992).
CCITT Recommendation I. 361, B-ISDN ATM Layer Specification, Study Group XVIII, Report R-116, §2, pp. 2–9 (Jul. 1992).
CCITT Recommendation I.432, B-ISDN User Network Interface-Physical Layer Specification, Study Group XVIII, Report R-119, §§4.3, 4.5, pp. 176–180, 180–187 (1992).

Primary Examiner—Salvatore Cangialosi

[57] ABSTRACT

The present invention provides a telecommunication network utilizing a passive optical network connecting a plurality of network terminations to a local exchange. Information cells and commands are transmitted on the network by the local exchange to all the network terminations. The information cells and commands contain routing address information for the particular network termination to which the information cell or command is destined. The address information contains the address of the destination network termination and additional identifier bits to facilitate encryption of the address information for security and privacy of traffic behavior without producing misdelivery occurrences. In addition, a system for repeatedly changing encryption patterns for the network terminations which detects misdelivery conditions is provided.

39 Claims, 9 Drawing Sheets

FIG. 1

Prior Art

METHOD AND APPARATUS FOR PRIVACY OF TRAFFIC BEHAVIOR ON A SHARED MEDIUM NETWORK

FIELD OF THE INVENTION

The present invention pertains to cryptographic communication in general, and more particularly to the encryption of routing information of data transmitted on a shared medium network.

BACKGROUND OF THE INVENTION

Optical transmission systems have enjoyed increasing usage throughout telephone network and switching systems. For example, optical fiber systems have replaced copper based transmission systems in many trunk and junction networks. As optical fiber systems become more pervasive in the user area of the telecommunication system, better and less expensive usage of the capabilities of optical fiber transmission systems will be in demand.

Within the user area, a contemplated application of optical transmission systems is for connection to a broadband integrated services digital network ("BISDN") for providing interactive services including the distribution of video signals in the local loop. The optical transmission system configuration envisioned for such a connection network is a shared medium passive optical network ("PON") having a tree-and-branch topology. This topology provides a cost-effective way to connect small businesses and residential subscribers to an BISDN, and has been used in several field trials for Plain Old Telephony Services and distributive services, such as the Amsterdam-Sloten Fibre to the Home Field which is described in H. H. Grotjohann, F. Jaeger and P. E. Schaafsma, Dutch FTTH on Trial, Communications International, p. 49 (January 1992).

In a PON, the optical fiber is shared by a group of customers. Further, in a PON having a tree-and-branch topology, a single fiber emanates from a local exchange and fans out via passive optical splitters and tree couplers to a plurality of service customers.

One conventional method for transmitting information from the local exchange to individual customers utilizing such a topology is as follows. Information is transmitted in packets or cells. Each transmitted cell contains data and address information of the intended destination customer. All information cells are transmitted through the entire PON to receivers located at the ends of the network which are called network terminations. Each network termination is connected to a corresponding customer or group of customers. When a network termination receives an information cell, it compares its address with the address contained within the cell. When the addresses match, the cell is passed to the proper customer. When a match is not detected, the network termination blocks the received information and does not transmit it to the customer.

Encryption of the data contained in information cells has been used to avoid the potential problem of eavesdropping by unscrupulous customers tapping into their network terminations. If the data was not encrypted, an unscrupulous customer would have access to all the information transmitted on the PON by the local exchange. Encrypted information cells, on the other hand, are properly deciphered only by the intended destination network termination. To insure this result, the same key is used by the LT and destination NT for encryption and decryption, respectively. A different key is associated with each NT.

One conventional method of encryption is to combine an information cell with a pseudo-random stream of binary bits using modulo 2 addition. Generation of the pseudo-random sequence can be accomplished by dedicated hardware, such as feedback shift registers, or in software. Deciphering the encrypted information stream occurs by combining, using modulo 2 addition, the encrypted information cell with the identical pseudo-random sequence used for encryption.

Some prior art systems have utilized encryption on all parts of the information cell except for the routing address information. As a result, conventional methods of encryption of data cells would not prevent an unscrupulous customer from obtaining information concerning the frequency of transmissions to or from the other customers on the network.

Encryption of the address information is desirable to insure privacy of traffic behavior of customers on the network. However, typical prior art systems have not encrypted the address information because of the inherent problem of extraneous transmissions of encrypted information cells to non-destination customers. These extraneous transmissions or misdeliveries present a security risk to the data contained in the information cells, as well as a burden to the control circuitry within the non-destination NTs. Misdeliveries occur when non-destination network terminations use their respective decryption patterns on the routing address information of the received information cells, and inadvertently produce addresses that are equal to their own. As a consequence, the still encrypted cells will be transmitted to unintended customer premises networks.

SUMMARY OF THE INVENTION

One embodiment of the present invention is a telecommunication system for a PON incorporating an encryption method for the routing address information of transmitted information cells. The method of encryption utilizes additional binary bits appended to the routing address information within each transmitted information cell. The additional bits may be redundant of information that is contained in particular bits in the routing address information. The added bit information exponentially increases the number of possible encryption patterns available to encrypt the routing address fields which facilitates the selection of encryption patterns that eliminate the potential for misdeliveries. The use of additional bits can also be applied to routing address information of encrypted commands transmitted by the local exchange granting permission to particular NTs to send data upstream. In this way also the privacy of the upstream traffic can be achieved.

An advantage of the present invention is the increased security achieved by maintaining privacy of information cell traffic behavior at minimal additional expense. Another advantage of the present invention is the substantial reduction of the possibility of misdelivery. Yet another advantage of the present invention is the prevention of an NT of misinterpreting a command to transmit data which was destined for another NT.

DETAILED DESCRIPTION

Figure 1:
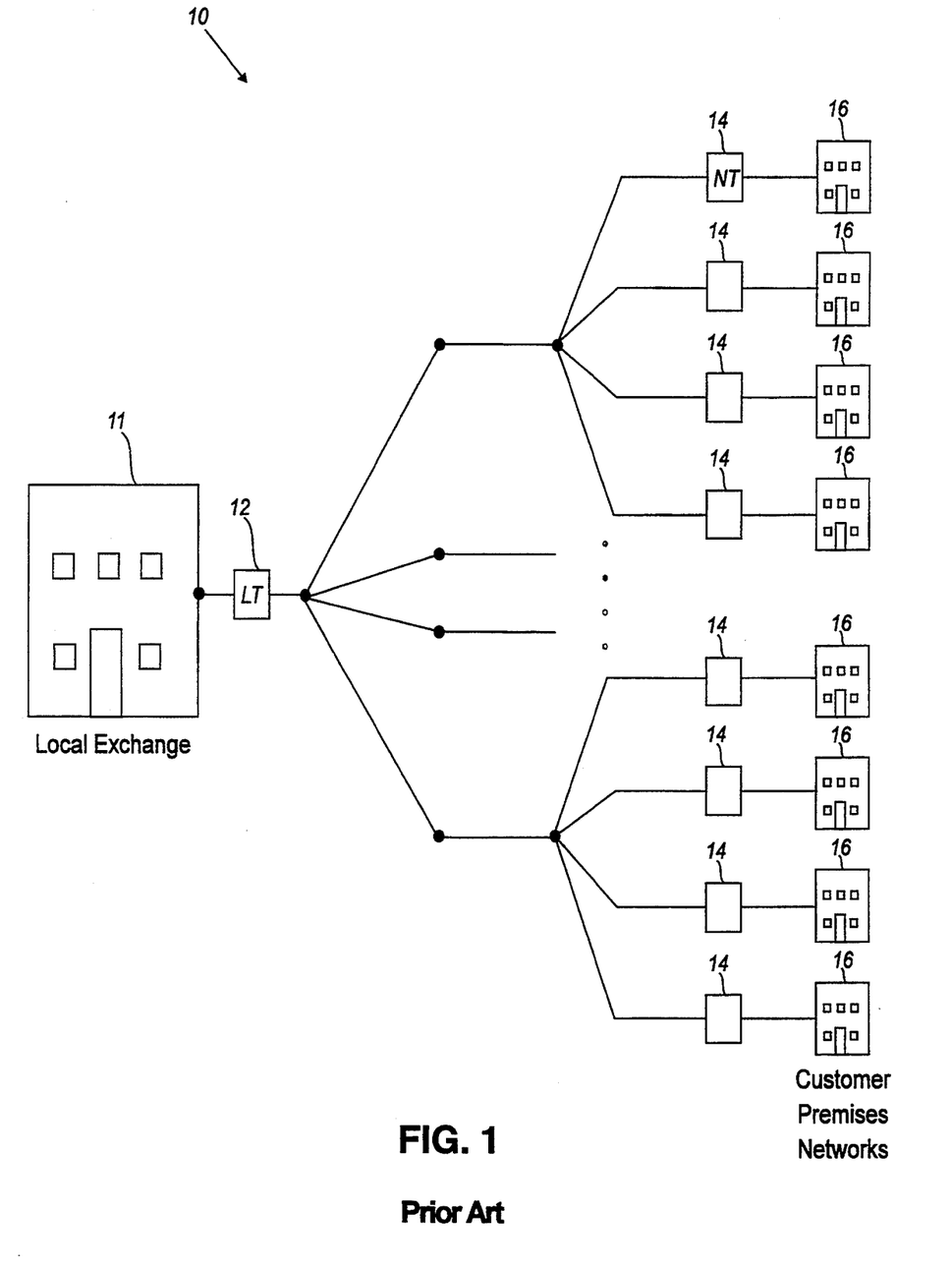
FIG. 1 illustrates a prior art telecommunication system local loop having a passive optical network with the preferred tree-and-branch topology.

A PON 10 with a tree-and-branch topology is shown in FIG. 1. In one embodiment of the present invention, it is envisioned that a network, such as the network 10 will be utilized for the transportation of asynchronous transfer mode ("ATM") information cells. In the network of FIG. 1, the information transmitted throughout the PON 10 is controlled at a local exchange 11 and line termination ("LT") 12. At the other side of the PON 10 there are a number of network terminations ("NT") 14. Each NT 14, in turn, is connected to a customer premises network 16.

Information is transmitted downstream from local exchange 11 through LT 12 to each of the NTs 14 and ultimately to the customer premises networks 16. The downstream traffic consists of information comprising a flow of ATM cells of the form shown in FIG. 2. The entire information stream is transmitted to all of the NTs 14. Each NT 14 sequentially extracts and processes the ATM cells from the stream and identifies those cells for which it is the intended destination. It then routes the identified cells to the associated customer network 16.

Figure 2:
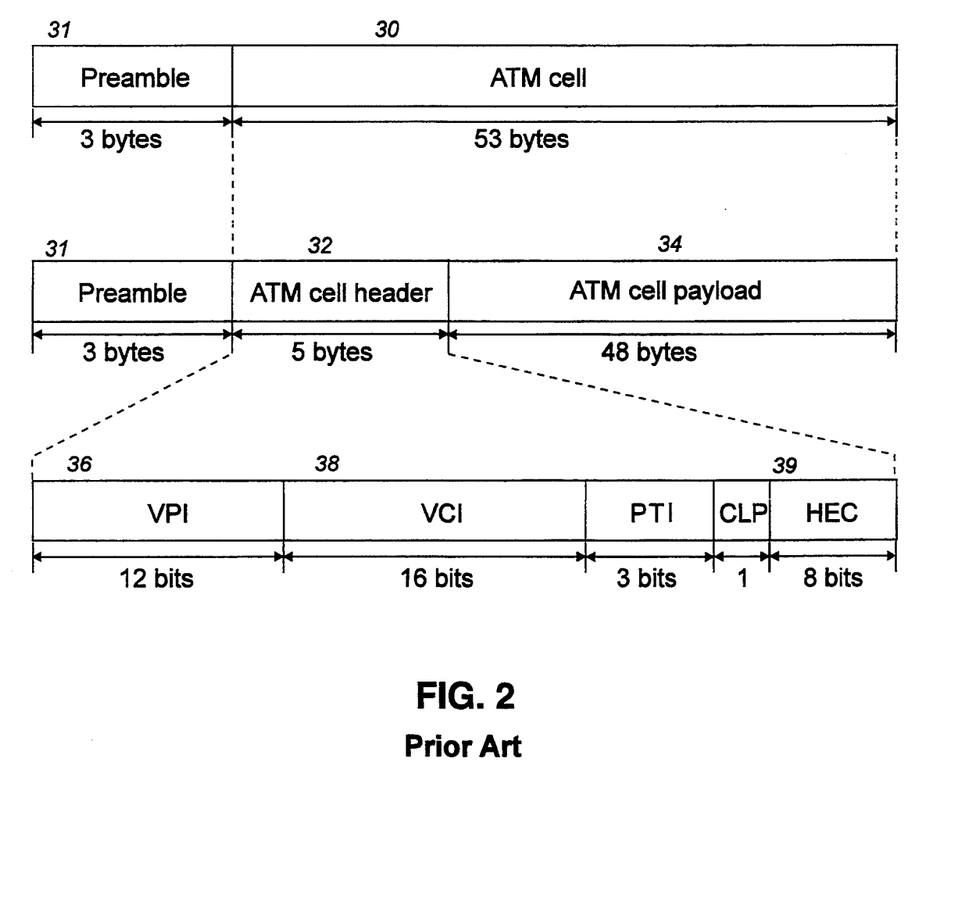
FIG. 2 illustrates a prior art format for an asynchronous transfer mode cell that is transmitted on the network of FIG. 1.

One fixed length data format used for the transmitted ATM cells is shown in FIG. 2. Asynchronous transfer mode or ATM is a technique for multiplexing and switching within a network for the transfer of data. A more detailed description of a standard ATM cell format is described in CCITT Recommendations I.361, B-ISDN ATM Layer Specification, Study Group XVIII, Report R-116, p. 2 (July 1992).

Referring to the data format of FIG. 2, an ATM cell 30 has a fixed length of 53 bytes which comprises: an ATM cell header 32 with 5 bytes, and an ATM cell payload 34 with 48 bytes. The ATM cell payload 34 contains the information transmitted by the sending party. The address information indicating the particular destination NT 14 for each cell may either be located in a virtual path identifier field 36 ("the VPI field") having 12 bits and/or the virtual channel identifier field 38 ("the VCI field") having 16 bits in the ATM cell header 32.

When the ATM cell 30 is transmitted on the PON network 10 in the downstream direction, it is preceded by a preamble 31 containing control information. The operations controlled by the 3 bytes of the preamble 31 are unrelated to encryption of the downstream cell and include such functions as laser control and upstream traffic control. However, an alternative location for the destination address information for the cell may be in the preamble 31.

The preamble 31 may also contain a command, called a permit, which controls upstream traffic by authorizing a particular NT 14 to transmit information in the upstream direction to the LT 12. A permit contains the address information of the particular NT 14 to which the command is directed. In general, the destination routing address of the permit in the preamble 31 can be different than that of the accompanying ATM information cell 30.

Referring back to the prior art PON 10 of FIG. 1, ATM cells transmitted in the downstream direction from the LT 12 to the NTs 14 are encrypted. The entire ATM cell except for the routing address information is encrypted in the LT 12 by combining the ATM cell with a particular pseudo-random sequence encryption pattern using modulo 2 addition. The particular encryption pattern used is based on the particular destination NT 14. As is stated above, each ATM cell is transmitted to all the NTs 14 in an information stream.

Upon receipt of an encrypted ATM cell, each NT 14 will examine the non-encrypted address field and determine whether it is the intended destination NT. If a particular NT 14 is the intended destination, that particular NT 14 will decrypt the encrypted ATM cell by combining its decryption pattern with the cell using modulo 2 addition. The particular decryption pattern used by an NT is identical to the pseudo-random sequence used for encryption of a cell that is destined for that NT. If the particular NT determines that it is not the intended destination, no decryption operation will occur. If the routing address information of the ATM cell is encrypted, then each of the NTs 14 must add their decryption pattern to the received address information to determine if the ATM cell is addressed to it.

Figure 3:
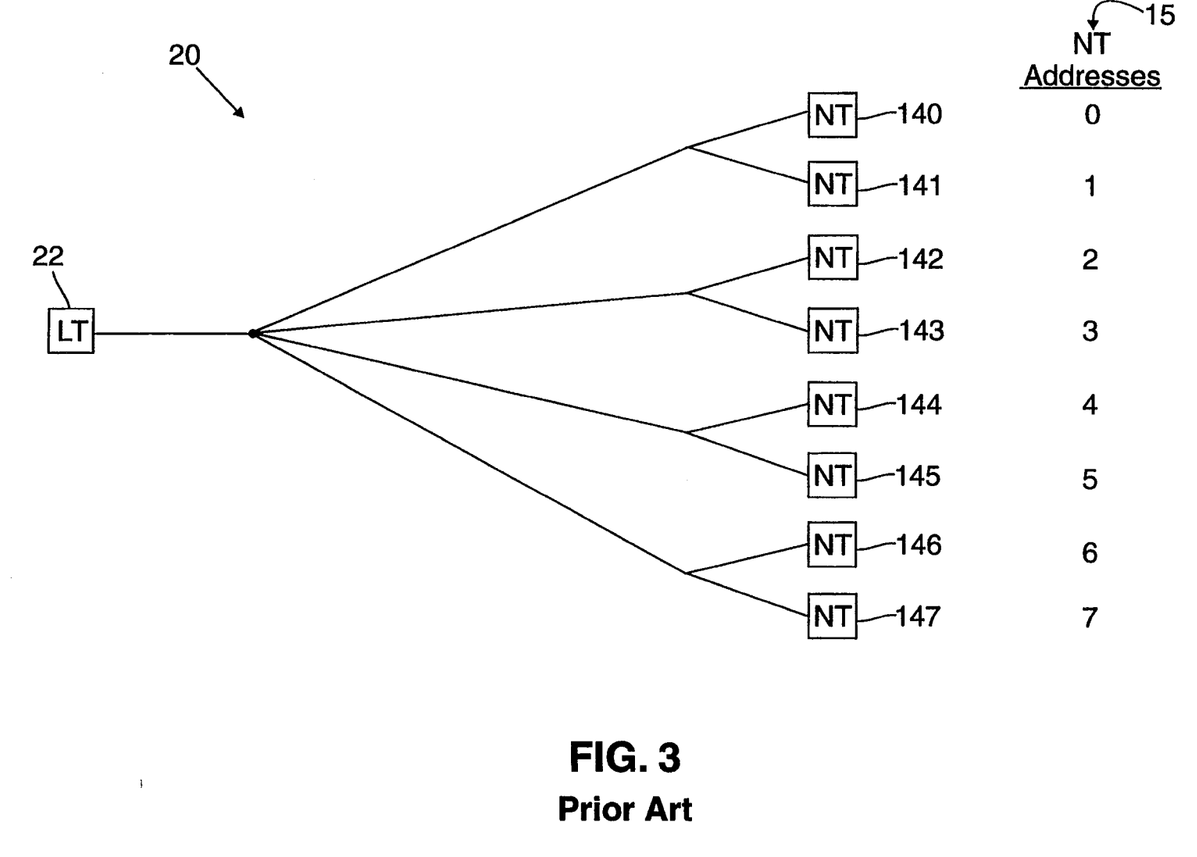
FIG. 3 is an illustration of the passive optical network of FIG. 1 with eight network terminations.

The disadvantage of encrypting the address information of an ATM cell or a permit according to a typical prior art PON will now be described with reference to FIGS. 3 and 4. In FIG. 3, a simple PON 20, for purposes of illustration, is shown with an LT 22 connected to eight NTs 140-147. Column 15 contains the decimal address information for each NT 140-147 in the network 20. The decimal routing addresses for the eight NTs 140-147 are 0-7, respectively. Three bits of the VPI/VCI field 36 and 38 of the ATM cell 30 (shown in FIG. 2) are required for binary transmission of the routing address information for the simple PON 20 of FIG. 3.

Figure 4:
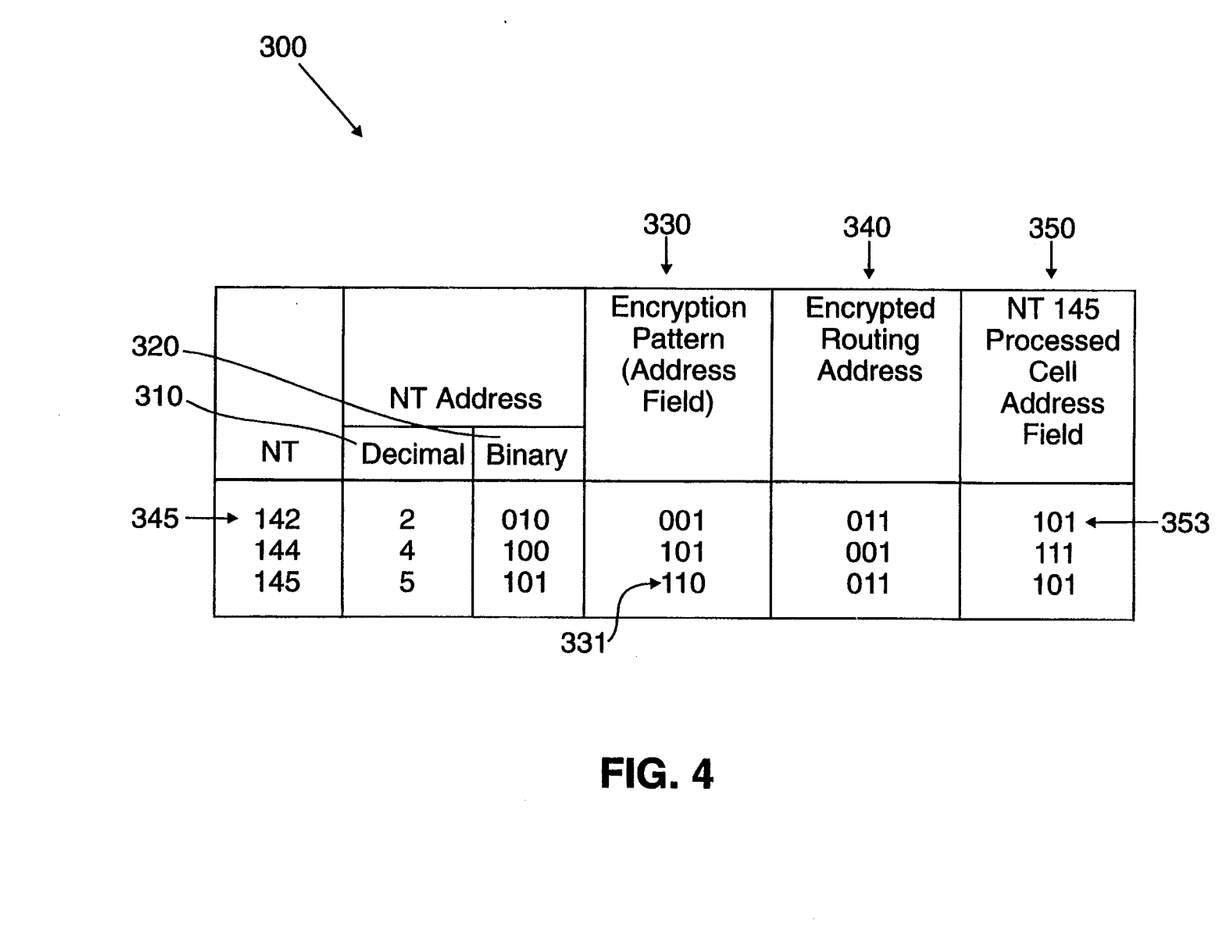
FIG. 4 is a table illustrating disadvantages of conventional techniques for the encryption of routing address information of information cells transmitted on the passive optical network of FIG. 3.

Table 300 of FIG. 4 illustrates the various results obtained for the encryption and decryption of the address fields of ATM cells destined for delivery to one of the NTs 142, 144 and 145 in the PON 20 of FIG. 3. In the table 300 of FIG. 4, column 310 contains the decimal address numbers 2, 4 and 5 for the three NTs 142, 144 and 145, respectively, and column 320 contains the corresponding three-bit binary equivalent addresses.

Three-bit segments or fragments of the unique pseudo-random sequences used for encryption of the address fields of information cells destined for delivery to the NTs 142, 144 and 145 are contained in column 330. The pseudo-random sequences are generated in the LT 22 and have a total length equal to that of the ATM cell. The code fragments listed in column 330 are the portions of the pseudo-random sequences which correspond to, or operate on, the routing address fields of the ATM cells.

Column 340 contains a listing of the corresponding encrypted routing address information calculated in the LT 22 from the relationship:

Encrypted Address$_K$=K $\oplus$ Encryption Pattern$_K$(Address field) where K corresponds to the destination NT binary address such as those listed in column 320, $\oplus$ represents modulo 2 addition, and encryption pattern$_K$ (Address field) denotes the address field portion of the encryption pattern used on ATM cells destined for NT$_K$, such as those listed in column 330. Thus, in row 345, the binary entry 011 in column 340 corresponds to the encrypted routing address information of an encrypted information cell transmitted to NT 142 and is the result of combining by modulo 2 addition the binary NT address, 010, in column 320, and the binary encryption pattern fragment, 001, in column 330.

The data contained in column 350 pertains to operations that occur within the NT 145 upon receipt of information cells containing the encrypted address information of column 340. The resulting information after an NT applies its decryption pattern to a received ATM cell will be referred to as a processed cell. Column 350 contains the address field portions of the processed cells which result after NT 145 has added its particular decryption pattern to the encrypted address information in column 340. The address field portions of the processed cells will be referred to as the processed address field values.

The processed address field values in column 350 were generated by combining the encrypted cell information of column 340 with the binary decryption pattern fragment 110 for the NT 145 using modulo 2 addition. The binary decryption pattern fragment 110 is identical to the binary pseudo-random encryption pattern fragment 331 in column 330 which was used to encrypt the routing address information of all ATM cells destined for NT 145.

A misdelivery problem will be discussed in conjunction with an entry 353 in column 350. Entry 353 illustrates a processed address field value for an ATM cell destined for NT 142 which has erroneously been decrypted as binary 101, or a decimal five, the address of the processing NT 145. As a result, the corresponding processed ATM cell, which has not been properly decrypted, would erroneously be delivered to the associated customer premises network. Utilizing the encryption pattern 331 of column 330 for the NT 145, such a misdelivery will occur for each information cell destined to NT 142.

Misdeliveries pose a security risk for the transmitted information as well as a burden on the processing circuitry in the associated customer premises networks. The misdelivery of the processed cell by NT 145 described above in no way effects the proper processing and delivery of the ATM cell by NT 142.

The principles discussed with regard to FIG. 3 are also applicable to systems with greater or lesser NT capacity. A typical PON supports 32 NTs, and thus, requires the use of five bits for the routing address information of the 28 bits of the VPI/VCI fields 36 and 38 of an ATM cell 30 (shown in FIG. 2). Although the misdelivery problem discussed above with regard to FIGS. 3 and 4 pertains to the encryption of ATM information cells, it will be readily understood by those skilled in the art that the encryption of the routing address information of permit commands will suffer from similar misdelivery problems in conventional PON systems.

In a telecommunication system employing up to $2^n$ NTs and utilizing an n-bit routing address field, there will be only $2^n$ possible encryption patterns to perform the functions of maintaining privacy of traffic behavior and avoidance of misdelivery situations. Thus, in a PON utilizing 32 NTs and a five bit destination address field, there are only 32 possible encryption pattern fragments available to operate on the address fields of the transmitted information cells to the 32 NTs. Because of this small number of possible encryption pattern fragments relative to the number of NTs, there is a substantial likelihood that in assigning one of the 32 encryption patterns to a corresponding one of the 32 NTs a misdelivery condition would result. Further, it is undesirable to use the same encryption pattern for more than one NT because if an unscrupulous person obtains the particular encryption pattern, he will be able to decipher data and commands transmitted to the two corresponding NTs.

Figure 5:
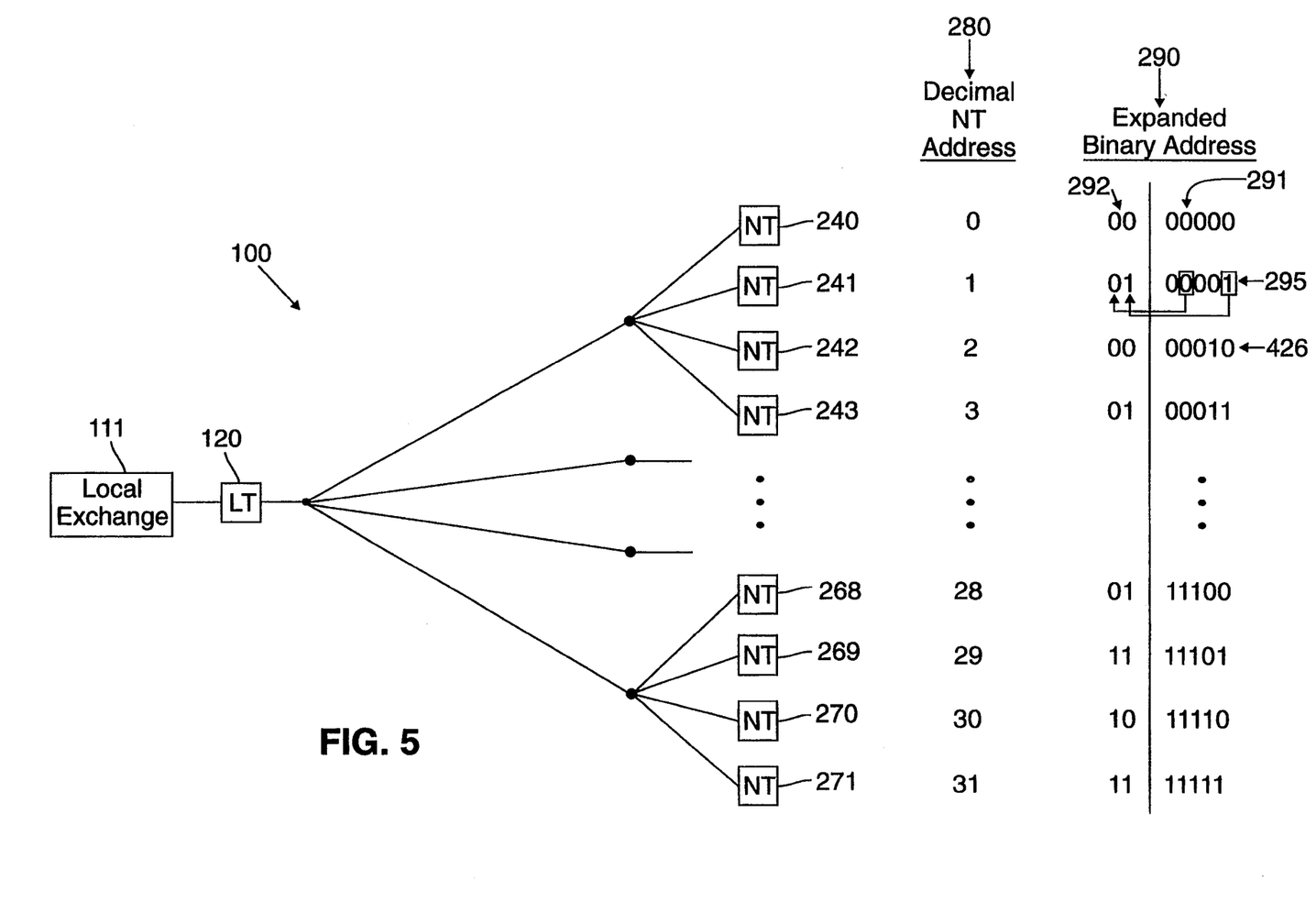
FIG. 5 is a passive optical network with extended routing address fields according to the present invention.

The present invention provides a method and apparatus which utilizes an expanded routing address field to substantially increase the number of possible encryption patterns available to the number of NT addresses. As shown in FIG. 5, a PON 100 has an LT 120, connected to 32 NTs 240-271 whose decimal routing addresses are 0-31, respectively. For simplicity and clarity of illustration, only a subset of NTs 240-271 and corresponding address information is shown. The decimal NT address information corresponding to the NTs 240-271 is shown in the address column 280. In this system, a binary expanded address containing seven bits instead of the usual five bits has been reserved in the VPI/VCI fields 36 and 38 of the ATM cell for the routing address information corresponding to the 32 NTs 240-271.

Column 290 contains the binary expanded address for each NT 240-271. A five bit subcolumn 291 contains the binary equivalent of the decimal NT address information of column 280. A two bit subcolumn 292 contains the additional identifier bits of the expanded address information. The additional identifier bits may be redundant of information that is contained in the address subcolumn 291. For example, in FIG. 5, the additional identifier bits in column 292 correspond to a first and fourth bit of the information contained in subcolumn 291. This relationship is illustrated for entry 295 of column 290.

In addition, the additional identifier bits of column 292 may be generated by some other processing techniques using the five-bit NT address information. For example, the additional identifier bits may be derived using particular boolean operations involving the five bit NT address information of subcolumn 291.

The addition of the additional identifier bits adds minimal cost to the processing of routing information in the LT 120 and NTs 240-271. More importantly, it will allow selection of 128, i.e., $2^7$, possible encryption pattern fragments for the routing address information of the 32 NTs 240-271. As a consequence, the potential for a misdelivery occurrence is significantly reduced or eliminated.

An advantage of the present invention is that conventional encryption techniques selected for operation on the ATM cell payload can now operate on the entire cell including the expanded routing information. No new complicated encryption techniques are required.

To further increase the level of security of a PON system 100 according to the present invention, it is desirable to repeatedly change the particular encryption pattern used for each of the NTs 240–271. Further, as it is generated, each new encryption pattern should be tested to determine if it would cause a misdelivery occurrence. A suitable encryption and verification circuit 400 according to the present invention for use in the LT 120 for transmission is illustrated in FIG. 6.

Figure 6:
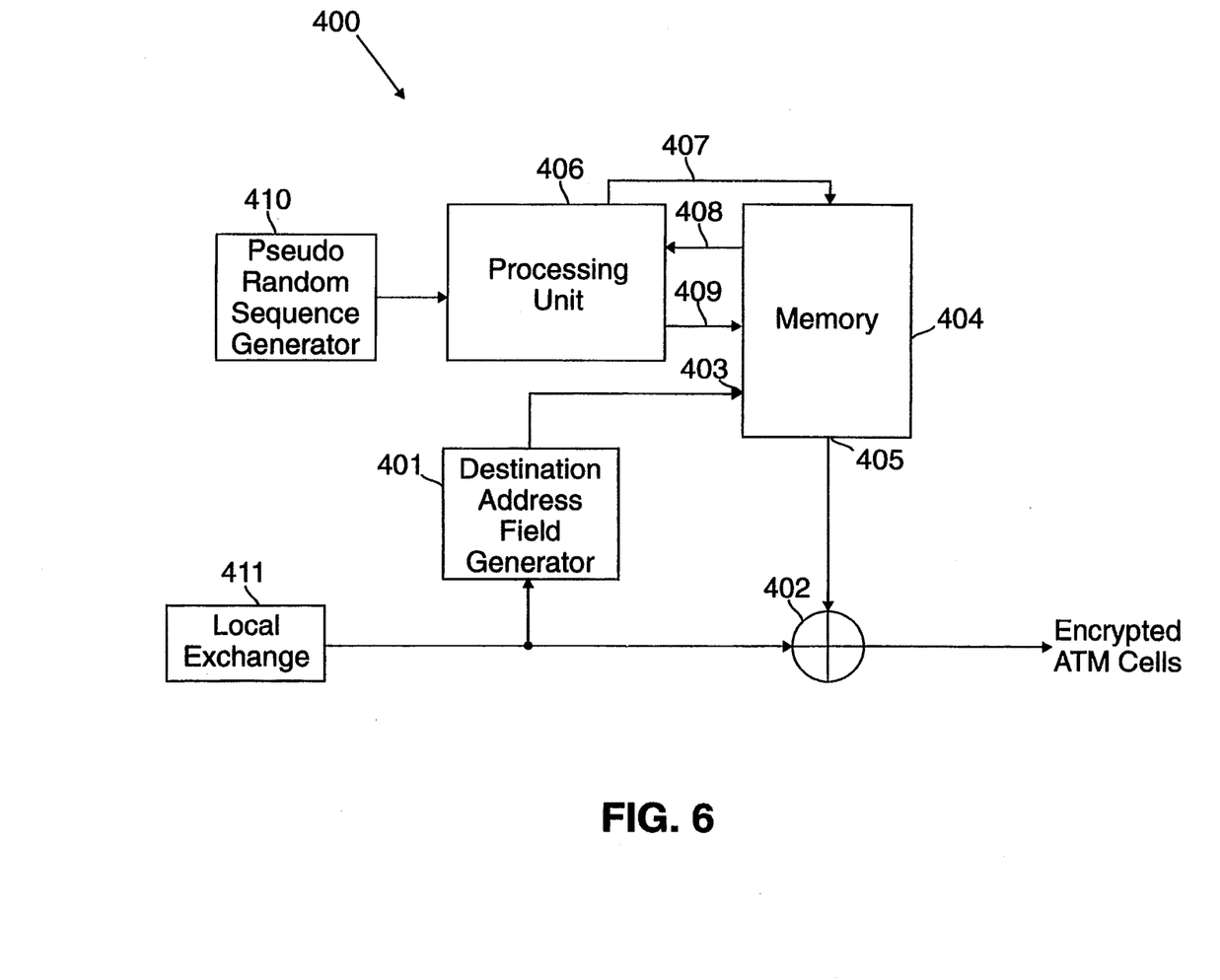
FIG. 6 is a schematic diagram of a circuit for use in a line termination of the passive optical network of FIG. 5.
Figure 7:
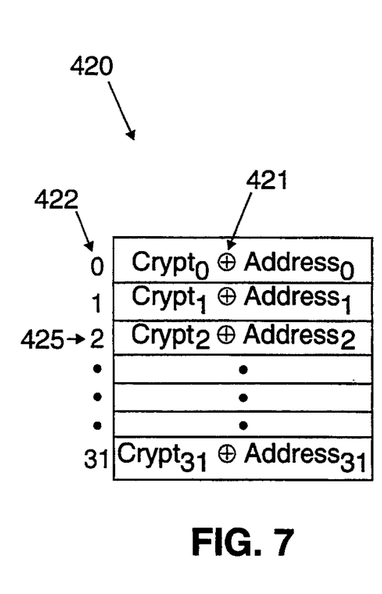
FIG. 7 is a suitable format for a memory device used in the circuit of FIG. 6.

In FIG. 6, ATM cells received from a local exchange 411, such as the local exchange 111 of FIG. 5, are applied to a destination address field extractor 401 and a modulo 2 adder 402. The address field extractor 401 is further connected to an address input 403 of a memory device 404. The memory device 404 contains a table of active pseudo-random sequences used to encrypt ATM cells destined to the various NTs 240–271 of FIG. 5. A suitable format for the table of memory device 404 is shown in FIG. 7 which is discussed below. A data output 405 of the memory device 404 is connected to the modulo 2 adder 402. The modulo 2 adder 402 generates the encrypted ATM cells which are transmitted to the NTs 240–271 of FIG. 5 by adding the ATM cells received from the local exchange with the proper pseudo-random sequences received from the memory device 404.

A processing unit 406 is connected to the memory device 404 by a data output line 407, a data input line 408 and an address line 409. An optional pseudo-random sequence generator 410 may be connected to the processing unit 406 as shown in FIG. 6.

In operation, the circuit 400 encrypts and transmits an ATM cell received from the local exchange by first reading the destination address information contained in the ATM cell with the address field extractor 401. The destination address information is then used as an address pointer to the corresponding location in the memory device 404 to retrieve the proper pseudo-random sequence for the destination NT. The retrieved pseudo-random sequence is then applied to the memory device output 405. The modulo 2 adder 402 then combines the ATM cell with the retrieved pseudo-random sequence on the memory device output 405 to form the encrypted ATM cell which is then transmitted on the network.

A suitable format for the table of memory device 404 is shown in FIG. 7. In an information table 420 of FIG. 7, column 421 contains the encryption patterns combined by modulo 2 addition with the particular corresponding expanded address information as is represented by Crypt $\oplus$ Address, for each one of the NTs 240–271 in PON 100 of FIG. 5. The numbers in column 422 are the memory location designators for each one of the 32 locations of the memory table 420. For example, the active pseudo-random encryption pattern contained at memory location 2 is the encryption pattern for information cells destined for NT 242, which has a decimal address equal to a 2 as shown in row 425 of FIG. 7. As shown at entry 426 in FIG. 5, the expanded binary address for the NT 242 is a binary 0000010. The reason for combining the expanded address information with the encryption pattern and storing the result in memory prior to encryption of an information cell is discussed below in connection with FIG. 8.

In FIG. 6, the processing unit 406 performs the periodic generation of new encryption patterns for use in the PON 100 of FIG. 5. Further, prior to use of any newly generated encryption pattern, the processing unit 406 performs a verification routine to detect if the newly generated encryption pattern would cause a misdelivery occurrence. By repeatedly changing the active encryption patterns, no particular encryption pattern is used for a sufficiently long enough period of time to permit a person who has tapped into the network to identify and use an encryption pattern to decipher information cells encrypted with that pattern.

Figure 8:
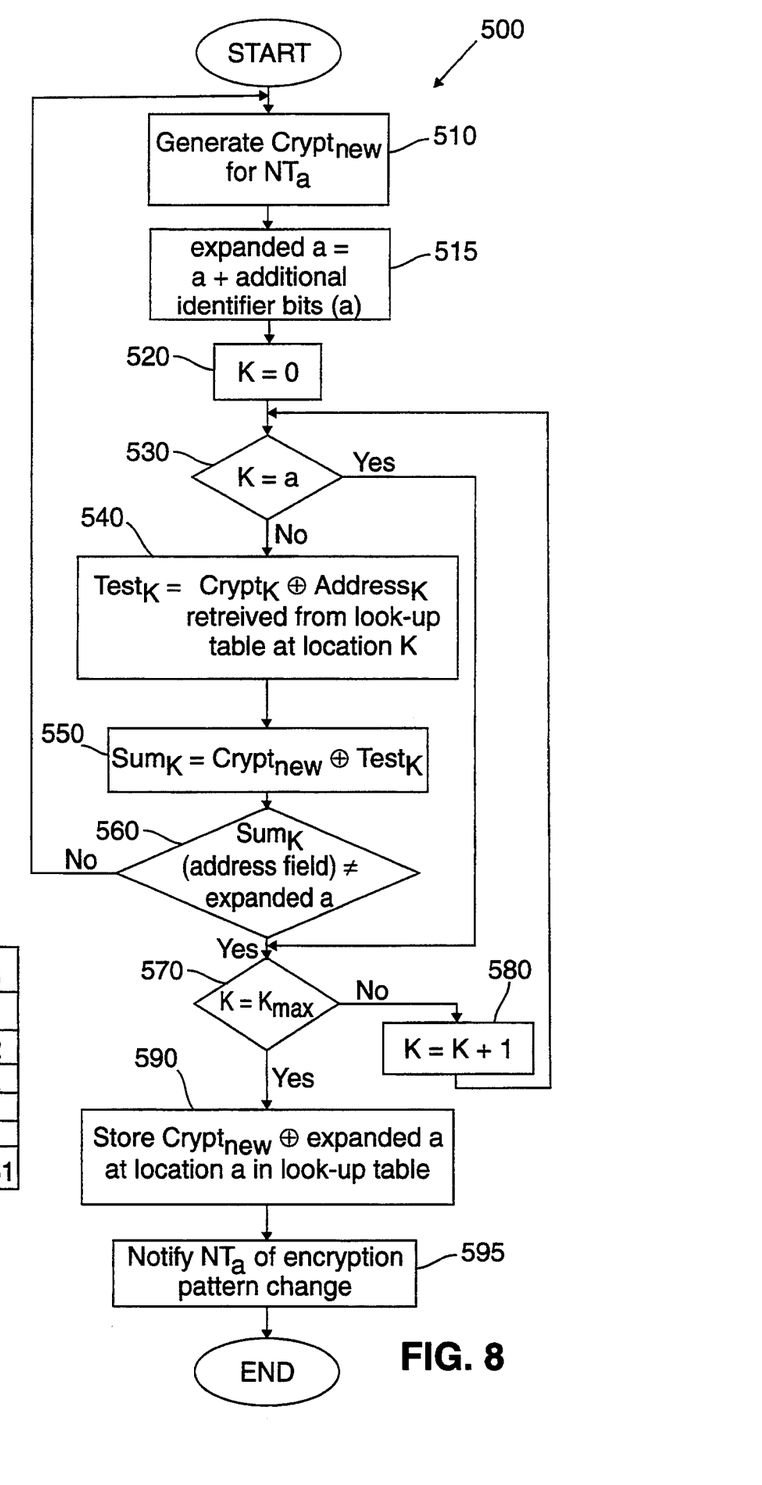
FIG. 8 is a flow diagram of a routine used in the circuit of FIG. 6 to generate new encryption patterns according to the present invention.

A suitable generation and verification routine 500 for the processing unit 406 of FIG. 6 is shown in FIG. 8. The routine 500 tests each newly generated encryption pattern by comparing it to each of the active pseudo-random encryption patterns in memory device 404 of FIG. 6. The generation and verification routine 500 utilizes these comparisons to determine whether a misdelivery occurrence would result if the newly generated encryption pattern is employed. If a misdelivery occurrence is detected, the new encryption pattern is discarded and a new pattern is generated for verification.

Referring to FIG. 8, in step 510, a new pseudo-random encryption pattern, $crypt_{new}$, is generated for possible use for an $NT_a$, where a is the decimal NT address of the particular NT. The pseudo-random encryption pattern may be generated in the processing unit 406 of FIG. 6, or an optional pseudo-random sequence generator 410 as shown in FIG. 6. An expanded address corresponding to the NT address a is then calculated in step 515 and is represented by the value expanded a. An address pointer K is then initialized to zero in step 520. The address pointer K will be used to retrieve the active pseudo-random encryption pattern for each of the NTs 240–271 from memory device 404 of FIG. 6 for testing against the newly generated encryption pattern, $crypt_{new}$. The address pointer K will also be used as a loop counter for the routine 500.

The address pointer K is then tested in step 530, and if the address pointer K is equal to the value a, the generation and verification routine 500 proceeds to step 570 because no verification needs to be performed of the encryption pattern at memory location a as the new encryption pattern was generated to replace the encryption pattern stored at that memory location. In the alternative, if in step 530, it is determined that K does not equal a, the generation and verification routine 500 proceeds to step 540. In step 540, the active encryption pattern at memory location K is retrieved as indicated by $test_K$ for testing against the newly generated encryption pattern, $crypt_{new}$. The active encryption pattern stored in the memory device 404 have previously been combined with the corresponding expanded address information as described above with reference to FIG. 7, and patterns are represented by $Crypt_K \oplus Address_K$ in step 540. Thus, the address field portion of the value $test_K$ is the address portion of the encryption pattern combined with a corresponding binary expanded address using modulo 2 addition.

A value $sum_K$ is then calculated in step 550 by combining, using modulo 2 addition, the expanded address field portion of the value $test_K$ with the expanded address field portion of the new encryption pattern, $crypt_{new}$. The mathematical operations performed in step 550 can be regarded as an emulation of the decryption operations that would occur in the $NT_K$ if the newly generated encryption pattern, $crypt_{new}$ was used for $NT_K$.

The address field portion of $sum_K$, which is represented by $sum_K$(address field) is then tested in step 560, and if it is equal to the value expanded K, a misdelivery event would occur if $crypt_{new}$ were to be used for encrypting ATM cells destined for the $NT_a$. If such a $crypt_{new}$ were used, all information cells destined for the $NT_a$, would be misdelivered to the $NT_K$. As a result, if the address field portion of the value $sum_K$ is equal to the value expanded a, the generation and verification routine 500 proceeds to step 510 and generates a new encryption pattern. On the other hand, if the address field portion of the value $sum_K$ is not equal to the value expanded a in step 560, then the generation and verification routine 500 proceeds to step 570.

In step 570, if address pointer K is not equal to the highest address $K_{max}$ of the NTs 240-271 of the PON 100, the generation and verification routine 500 increments the address pointer K in step 580 and proceeds to test the newly generated encryption pattern, $crypt_{new}$, against the encryption pattern of the NT at the address of the incremented K by performing steps 530 through 560 with the incremented K. In the alternative, if the address pointer K is equal to the highest address, $K_{max}$, the newly generated encryption pattern, $crypt_{new}$, has been successfully tested against all the active NT encryption patterns for detection of misdeliveries and the generation and verification routine 500 proceeds to step 590.

In step 590, the newly generated encryption pattern, $crypt_{new}$, is combined by modulo 2 addition with its corresponding expanded binary address, the value expanded a, and the combined pattern is then loaded into the memory device 404 at location a. By storing the new encryption pattern in memory device 404, the pattern then becomes the active pseudo-random encryption pattern used to encrypt cells destined for the $NT_a$. The corresponding particular NT 240-271 at address a is then notified of the encryption pattern change in step 595.

It will be readily understood by those skilled in the art that the generation and verification routine 500 described above can be modified to operate in a PON system that stores the active pseudo-random encryption patterns in memory 404 of FIG. 5 without combining them with their respective expanded address information. If the additional identifier bits of the expanded address information contains redundant information or other predictable information, the processing unit 406 can calculate a respective expanded address and combine it with the respective encryption pattern from memory device 404 in generating the value $test_K$ in step 550 of FIG. 8.

The generation and verification routine 500 should be periodically performed for each of the respective NTs of the PON by the processing unit 406 of FIG. 6. The processing unit 406 may use any method to determine the order in which the particular NTs 240-271 of FIG. 5 are to have their corresponding encryption patterns updated. The routine 500 may generate and verify new encryption patterns for each of the NTs in a sequential order or in a random fashion. Further, the NTs may be ranked in a manner corresponding to the required level of security of the customer associated with a particular NT. The ranking of NTs may be used to ensure that the NTs associated with customers requiring a higher level of security will have their corresponding pseudo-random encryption patterns updated more frequently than those NTs associated with customers requiring a lower level of security.

Figure 9:
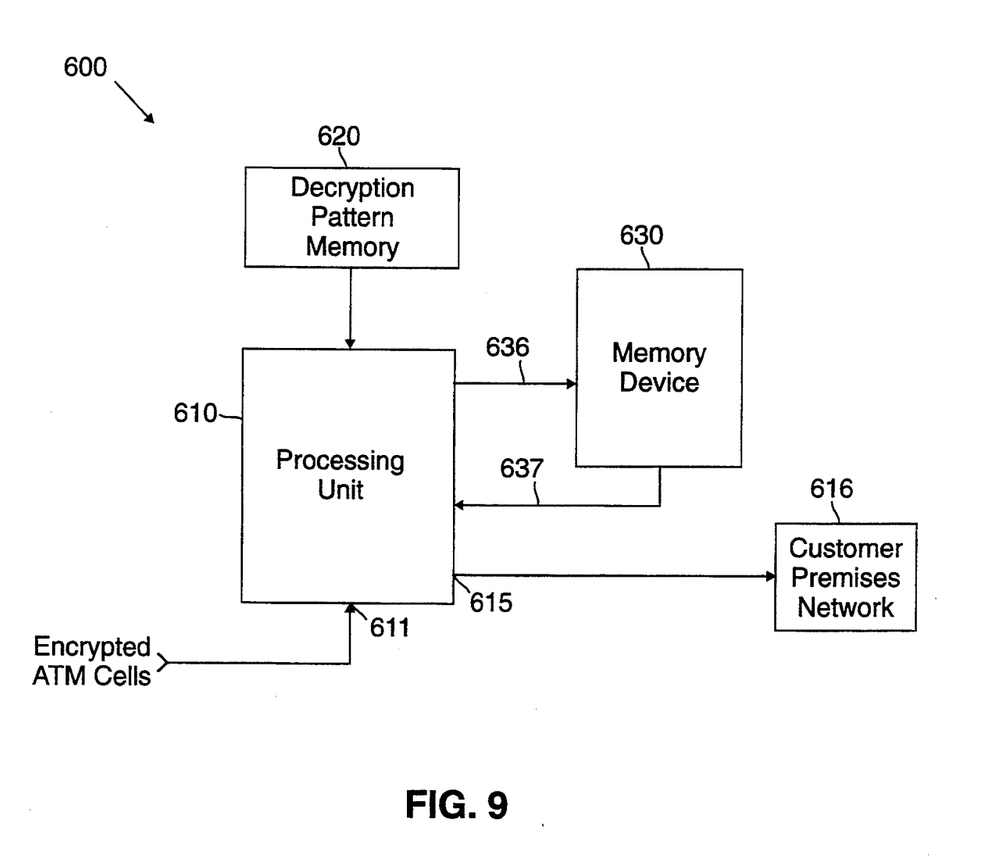
FIG. 9 is a schematic diagram of a suitable circuit that can be used in each of the network terminations in a system according to the present invention.

FIG. 9 is a schematic diagram of a suitable circuit 600 for use in each of the NTs 240-271 of FIG. 5 to determine whether an ATM cell containing encrypted expanded address information is to be transmitted to an associated customer premises network. In FIG. 9, each of the received encrypted ATM cells by an NT is applied to an input 611 of a processing unit 610. An output 615 of the processing unit 610 is connected to an associated customer premises network 616, such as customer premises network 16 of FIG. 1. Processing unit 610 is also connected to memory devices 620 and 630.

Figures 10, 11:
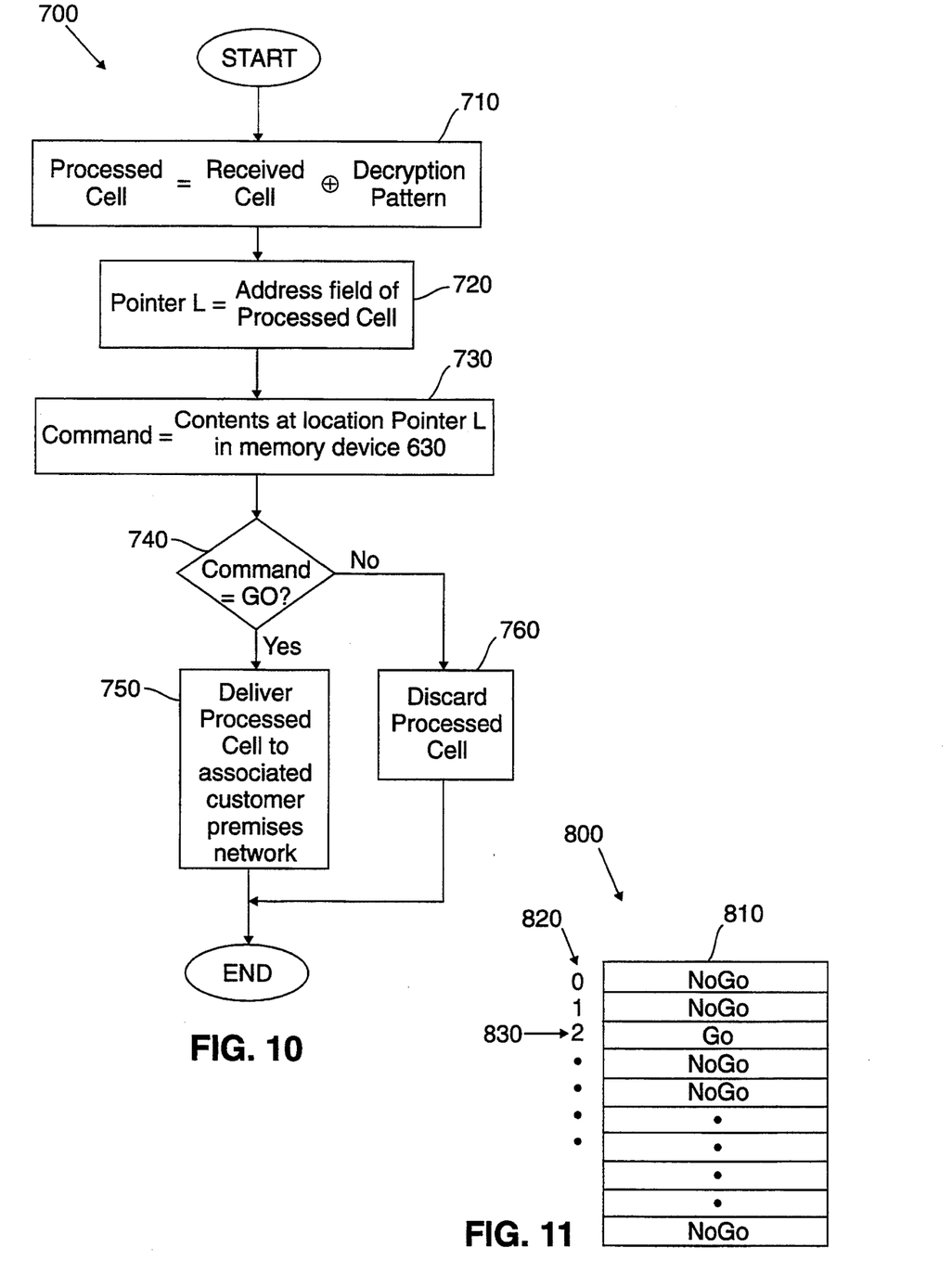
FIG. 10 is a flow diagram of a processing sequence suitable for use in the circuit of FIG. 9.
FIG. 11 is a suitable format for a memory device to be used in the circuit of FIG. 9.

Memory device 620 contains the decryption pattern for the NT and memory device 630 is a memory table of commands directing whether or not a processed cell should be transmitted to the customer premises network 616. For example, the commands contained at a particular memory location of memory device 630 may be a "Go" indicating the processed cell should be transmitted to the associated customer premises network or a "NoGo" indicating the cell should be discarded. A suitable storage format for memory device 630 is shown in FIG. 11 which is described below. The processing unit 610 of FIG. 9 extracts data contained in the memory device 630 using an address line 636 and a data input line 637.

FIG. 10 depicts a suitable processing routine 700 for use by the processing unit 610 of FIG. 9 to determine whether a received ATM cell should be delivered to the associated customer premises network 616. In step 710 of routine 700, a processed cell is derived by combining, using modulo 2 addition, a received encrypted information cell with a particular decryption pattern for the processing NT. The particular encryption is retrieved from the memory device 620 of FIG. 9. Then, in step 720, an address pointer L is defined as the contents of the address field portion of the processed cell which was generated in step 710. The processing routine 700 proceeds to step 730, where a command is retrieved from the memory device 630 of FIG. 9 at a memory location corresponding to address pointer L.

The retrieved command is then tested in step 740, and if the command indicates that the processed cell is to be delivered to the associated customer premises network, the processing routine 700 proceeds to step 750, otherwise the processing routine 700 proceeds to step 760. For example, in the memory device 630 described above containing the commands Go and NoGo, if the command retrieved in step 730 is a Go then the routine 700 proceeds to step 750. In the alternative, if the retrieved command was a NoGo then the routine 700 proceeds to step 760 from step 740. In step 750, the processed cell is delivered to the associated customer premises network, and conversely, in step 760, the processed cell is discarded. The processing routine 700 is repeated for all ATM cells.

A suitable memory table format 800 for commands contained in the memory device 630 of FIG. 9 is shown in FIG. 11. Referring to FIG. 11, the memory table 800 has a command corresponding to a "Go" or "NoGo" in each of its memory locations. The commands contained in the respective locations of memory table 800 are shown in column 810. A command entry exists for each one of the possible expanded address values. Each command in column 810 is stored at a memory location having a particular decimal address as shown in column 820. For example, in a command entry 830 at decimal address 2 is a "Go" in column 810 indicating that a processed cell having an expanded address equal to a decimal 2 should be delivered to the associated customer premises network 616 of FIG. 9. Likewise, the corresponding command for a processed cell having an expanded address other than a 2 is "NoGo" in the memory table 800 which indicates that the processed cell should be discarded and not delivered to the associated customer premises network 616.

A benefit of using the memory table configuration 800 of FIG. 11 is the ease with which an NT possessing more than one address can be implemented. To implement such an NT, the table configuration of memory device 630 of FIG. 9 should contain a "Go" command at all the memory locations corresponding to the expanded addresses which are to be used for that particular NT. It will be readily understood by those skilled in the art that the memory device 630 of FIG. 9 can be replaced by suitable control logic circuitry or other means that will generate an output value corresponding to a "Go" command for the particular expanded address or addresses of that NT and a "NoGo" command for all other addresses.

A PON 100 according to the present invention employing expanded address information for the routing of ATM cells provides a substantially higher level of security and privacy of traffic behavior than in prior art networks without the disadvantages inherent in the prior art networks. In a PON 100 having 32 NTs, it is preferred that two or more additional identifier bits be used to achieve adequate performance in the generation of new encryption codes. A further increase in the level of security can be achieved by the repeatedly generation and verification of new encryption patterns for each of the NTs according to the present invention.

While the present invention has been described in terms of a conventional format for an ATM cell transferable on a shared medium passive optical network, it should be apparent that the present invention need not be limited to a passive optical system, but is applicable to other shared mediums where encryption is performed, such as copper wire or wireless systems. In addition, the invention can also be implemented in other network topologies such as ring or bus configurations, or used with other types of information packet or packet cell formats, fixed length or otherwise.

We claim:

1. A circuit for the generation and validation of new encryption patterns for the transmission of data cells and commands on a shared medium network having a line termination transmitting the data cells and commands, and a plurality of network terminations, each transmitted data cell or command containing encrypted address information of its destination network termination, the address information being the destination network termination address plus additional identifier bits, and a different encryption pattern being used for each destination network termination, the circuit comprising;
   a microprocessing unit for performing the generating and verifying of the new encryption patterns; and
   a memory device for storing and retrieval of active encryption pattern information, the memory device being connected to the processing unit, wherein the processing unit generates a new encryption pattern for a particular network termination which is verified by sequentially processing it with each of the active encryption patterns to detect for potential misdeliveries, and storing it in a respective location of the memory device if a potential misdelivery condition is not detected in each of the processing results, and generating a new encryption pattern to be verified if any of the processing results indicate potential misdeliveries.

2. The circuit of claim 1, further comprising:
   a pseudo-random number generator being connected to the processing unit for generating the new encryption patterns.

3. The circuit of claim 1, wherein a format of the memory table having the encryption patterns at memory address locations corresponding to the addresses of the respective network terminations.

4. A method of generating and evaluating pseudo-random encryption patterns for encrypting destination address information contained in data cells or commands on a shared medium network, the network having a line termination and a plurality of network terminations, the method comprising:
   generating a new pseudo-random encryption pattern for the address information of data cells or commands destined for a particular network termination, the address information containing the destination network termination address and additional identifier bits;
   generating a sum for each encrypted address information for data cells or commands destined for the other network terminations by adding, using modulo 2 addition, the encrypted address information for the other network terminations with a portion of the new encryption pattern used for encrypting the address information; and
   comparing each sum with the address of the particular network termination for which the new encryption pattern is generated, wherein if all sums are not equal to the address of the particular network termination for which the pattern was generated, then the new encryption pattern is valid and may be used in the network.

5. The method of claim 4, further comprising:
   notifying the particular network termination of the new encryption pattern which has been generated and determined valid for use of encrypting the address information for data cells and commands destined to that network termination.

6. The method of claim 4, further comprising:
   storing the encryption patterns for the network termination in a memory device.

7. The method of claim 4, wherein the method is repeatedly sequentially performed to generate and evaluate new encryption patterns corresponding to each network termination in the network.

8. The method of claim 4, wherein the method is repeatedly randomly performed to generate new encryption patterns corresponding to each network termination in the network.

9. The method of claim 4, further comprising:
   ranking each network termination based on the required level of security wherein new encryption patterns will be generated and tested more frequently for the network terminating requiring a higher level of security than those requiring a lesser level of security.

10. A method for transmitting data cells from a line termination to a plurality of network terminations over a shared medium network having privacy of traffic behavior, each network termination having a unique address, the method comprising:

combining identifier bits with destination address information for each data cell to form a corresponding expanded address;

inserting the expanded address into the destination address field of the corresponding data cell;

encrypting the expanded address using a particular encryption pattern corresponding to the destination network termination;

transmitting the data cell on the shared medium network, each network termination receiving the data cell transmitted on the network;

processing the encrypted expanded address of the data cell with a particular decryption pattern corresponding to a network termination to form a processed address, each network termination performing such processing on the received data cell; and verifying whether identifier bits of the processed address are proper if a destination address of the processed address corresponds to the network termination address.

11. The method of claim 10, wherein the identifier bits correspond to particular bits of the destination network termination address.

12. The method of claim 10, wherein the identifier bits are derived from the destination network termination address.

13. A shared-medium network having privacy of traffic behavior comprising:

a line termination having a processing unit connected to a memory device, wherein the line termination is operable to transmit data cells and to combine identifier bits with a destination address to form an expanded address, and insert the expanded address into an address field of each data cell to be transmitted and encrypt the expanded address using a particular encryption pattern corresponding to a destination network termination, and;

a shared medium network operably connected to the line termination processing unit; and a plurality of network terminations connected to the network, each network termination having a processing unit connected to a memory device, the processing unit being operably connected to the network, each network termination having a unique address, wherein each network termination processing unit is operable to process the encrypted expanded addresses of each data cell received from the network with a decryption pattern corresponding to the network termination address, and to verify that identifier bits of the processed address are proper if a destination address of the processed address corresponds to the network termination address.

14. The network of claim 13, wherein the identifier bits correspond to particular bits in the destination network termination address.

15. The network of claim 13, wherein the identifier bits are derived from the destination network termination address.

16. The network of claim 13, wherein the shared-medium network is a optical network.

17. The network of claim 16, wherein the passive optical network has a tree-and-branch topology.

18. The network of claim 13, wherein the data cells are asynchronous transfer mode cells.

19. The network of claim 13, wherein the data cells contain commands giving authority to the particular destination network termination to transmit data to the line termination.

20. The method of claim 10, further comprising the steps of:

updating the encryption pattern and corresponding decryption pattern for each network termination address; and providing the updated decryption patterns to the respective network terminations.

21. The method of claim 20, wherein the steps of updating and providing the decryption patterns to the network terminations is performed periodically.

22. The method of claim 20, wherein the steps of updating and providing the decryption patterns to the network terminations is performed randomly.

23. A method for transmitting data cells to a plurality of network terminations over a shared medium network, wherein each network termination has a unique address, the method comprising:

combining identifier bits with destination address information for each data cell to form a corresponding expanded address;

inserting the expanded address into a destination address field of the corresponding data cell;

encrypting the address field using a particular encryption pattern corresponding to the destination address; and transmitting the data cell with encrypted address field on the shared medium network.

24. The method of claim 23, wherein the identifier bits correspond to particular bits of the destination network termination address.

25. The method of claim 24, wherein the identifier bits are derived from the destination network termination address.

26. The method of claim 23, further comprising the step of updating the encryption pattern for each network termination address.

27. The method of claim 26, wherein the step of updating the encryption patterns is performed periodically.

28. The method of claim 26, wherein the step of updating the encryption patterns is performed randomly.

29. The method of claim 26, further comprising the step of notifying each of the network terminations of an updated decryption pattern corresponding to the respective updated encryption pattern.

30. A method for a network termination for receiving data cells transmitted over a shared medium network to provide privacy of traffic behavior and prevent misdeliveries, each network termination being connected to the network and having a unique address, each transmitted data cell having an address field containing an expanded destination address, the expanded destination address including a particular destination network termination address combined with identifier bits based on the destination address, the address field of each data cell being encrypted using an encryption pattern corresponding to the destination address, the method comprising:

processing the expanded encrypted address of the data cell with a particular decryption pattern corresponding to the respective network termination to form a processed address; and verifying whether identifier bits of the processed address are proper if a destination address of the processed address corresponds to the network termination address.

31. The method of claim 30, wherein the identifier bits are derived from the destination network termination address.

32. The method of claim 30, further comprising:
providing the data cell to a customer premises network connected to the network termination if the identifier bits are determined to be proper in the verifying step.

33. A line termination circuit for transmitting data cells to a plurality of network terminations over a shared medium network having privacy of traffic behavior, each network termination having a unique address, the circuit comprising:
a processing unit; and
a memory device connected to the processing unit, wherein the processing unit is operable to:
combine identifier bits with the destination address for each data cell to form a corresponding expanded address, wherein the identifier bits facilitate verification of the destination address when decrypted,
insert the expanded address into an address field of the corresponding data cell,
encrypt the address field using a particular encryption pattern corresponding to the destination network termination, and
transmit the data cell with encrypted address field on the shared medium network.

34. The circuit of claim 33, wherein the encryption patterns for the network terminations are stored in the memory device.

35. The circuit of claim 33, wherein the processing unit is further operable to update the encryption patterns.

36. The circuit of claim 35, wherein the processing unit is further operable to notify each of the network terminations of an updated decryption pattern corresponding to the respective updated encryption pattern.

37. A network termination circuit for receiving data cells from a shared medium network, wherein each transmitted data cell contains encrypted expanded address information of a destination network termination, the expanded address information including the destination network termination address combined with identifier bits corresponding to the destination address, the expanded address information being encrypted by an encryption pattern corresponding to the destination network termination, the circuit comprising:
a processing unit; and
a memory device connected to the processing unit, wherein the processing unit is operable to:
process the encrypted expanded address of each received data cell with a particular decryption pattern corresponding to the network termination address to form a processed address, and
verify whether identifier bits of the processed address are proper if a destination address of the processed address corresponds to the network termination address.

38. The circuit of claim 37, wherein the decryption pattern is stored in the memory device.

39. The circuit of claim 38, wherein the processing unit is further operable to receive updated decryption patterns and store the updated decryption patterns in the memory device.

* * * * *